United States Patent
Kadous et al.

(10) Patent No.: US 9,311,819 B1
(45) Date of Patent: *Apr. 12, 2016

(54) VISUALIZATION OF TRAFFIC PATTERNS USING GPS DATA

(71) Applicant: Google Inc., Mountain View, CA (US)

(72) Inventors: Mohammed Waleed Kadous, Sunnyvale, CA (US); Andrew Lookingbill, Palo Alto, CA (US); Joakim Kristian Olle Arfvidsson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,457

(22) Filed: May 22, 2015

Related U.S. Application Data

(63) Continuation of application No. 14/189,933, filed on Feb. 25, 2014, now Pat. No. 9,070,296, which is a continuation of application No. 12/898,618, filed on Oct. 5, 2010, now Pat. No. 8,694,241.

(51) Int. Cl.
  *G06F 7/00* (2006.01)
  *G08G 1/00* (2006.01)
  *G01S 19/14* (2010.01)
(52) U.S. Cl.
  CPC .. *G08G 1/20* (2013.01); *G01S 19/14* (2013.01)
(58) Field of Classification Search
  CPC .................................. G08G 1/20; G01S 19/14
  USPC ......................................................... 701/408
  See application file for complete search history.

(56) References Cited

U.S. PATENT DOCUMENTS

| | | | |
|---|---|---|---|
| 5,005,198 | A | 4/1991 | Toda |
| 5,036,532 | A | 7/1991 | Metroka et al. |
| 5,893,081 | A | 4/1999 | Poppen |
| 6,333,703 | B1 | 12/2001 | Alewine et al. |
| 6,385,539 | B1 | 5/2002 | Wilson et al. |
| 7,221,928 | B2 | 5/2007 | Laird et al. |
| 7,536,190 | B1 | 5/2009 | Creemer |
| 7,557,730 | B2 | 7/2009 | Gueziec |
| 7,701,363 | B1 | 4/2010 | Zlojutro |
| 7,912,628 | B2 | 3/2011 | Chapman et al. |
| 8,000,892 | B2 * | 8/2011 | Banerjee ..................... 701/433 |

(Continued)

FOREIGN PATENT DOCUMENTS

| | | |
|---|---|---|
| JP | 2005-283386 A | 10/2005 |
| JP | 2009-109400 A | 5/2009 |

OTHER PUBLICATIONS

"Path Tracker", Pathtracks.com, 2 pages, [online] [retrieved on Mar. 31, 2011] retrieved from the internet <URL:http://pathtracks.com/>.

(Continued)

*Primary Examiner* — Richard Camby
(74) *Attorney, Agent, or Firm* — Fenwick & West LLP

(57) ABSTRACT

Maps are created that display representations of GPS data generated from a plurality of GPS devices. The GPS data received from the GPS devices is embodied as a representation having descriptive features that visually indicate the location, direction of travel, and speed of travel of the GPS device, and the representation is associated with a road segment on the map. The display of the GPS data from a plurality of GPS devices can be used for editing information about roads on maps and determining preferred routes.

20 Claims, 9 Drawing Sheets

(56) References Cited

U.S. PATENT DOCUMENTS

| | | | |
|---|---|---|---|
| 8,099,236 B2* | 1/2012 | Olson et al. | 701/423 |
| 8,103,439 B2* | 1/2012 | Onishi et al. | 701/410 |
| 8,160,805 B2* | 4/2012 | Downs et al. | 701/117 |
| 8,260,542 B2 | 9/2012 | Kimishima | |
| 8,275,490 B2 | 9/2012 | Brusilovsky et al. | |
| 8,386,157 B2 | 2/2013 | Kim | |
| 8,694,240 B1 | 4/2014 | Lookingbill et al. | |
| 8,694,241 B1 | 4/2014 | Kadous et al. | |
| 2002/0169543 A1 | 11/2002 | Blewitt | |
| 2004/0002366 A1 | 1/2004 | Cromer et al. | |
| 2004/0097275 A1 | 5/2004 | Ohno et al. | |
| 2004/0102893 A1 | 5/2004 | Atkinson et al. | |
| 2004/0204840 A1 | 10/2004 | Hashima et al. | |
| 2007/0038364 A1 | 2/2007 | Lee et al. | |
| 2007/0072553 A1 | 3/2007 | Barbera | |
| 2008/0033635 A1 | 2/2008 | Obradovich et al. | |
| 2008/0082254 A1 | 4/2008 | Huhtala et al. | |
| 2008/0234921 A1 | 9/2008 | Groenhuijzen et al. | |
| 2008/0300782 A1 | 12/2008 | Kohno et al. | |
| 2008/0312819 A1 | 12/2008 | Banerjee | |
| 2009/0029687 A1 | 1/2009 | Ramer et al. | |
| 2009/0281719 A1 | 11/2009 | Jakobson | |
| 2010/0125409 A1 | 5/2010 | Prehofer | |
| 2010/0156709 A1 | 6/2010 | Zhang et al. | |
| 2010/0332119 A1 | 12/2010 | Geelen et al. | |
| 2011/0015817 A1 | 1/2011 | Reeve | |
| 2011/0093188 A1 | 4/2011 | Barkai et al. | |
| 2011/0106416 A1 | 5/2011 | Scofield et al. | |
| 2011/0137551 A1 | 6/2011 | Peri | |
| 2011/0199259 A1 | 8/2011 | Karaoguz et al. | |
| 2011/0224893 A1 | 9/2011 | Scofield et al. | |
| 2011/0224898 A1 | 9/2011 | Scofield et al. | |
| 2012/0021717 A1 | 1/2012 | Schmidt | |
| 2012/0046860 A1 | 2/2012 | Curtis et al. | |
| 2012/0053823 A1 | 3/2012 | Wilson | |
| 2012/0109517 A1 | 5/2012 | Watanabe | |
| 2012/0115505 A1 | 5/2012 | Miyake et al. | |
| 2012/0253656 A1 | 10/2012 | Brandt | |
| 2012/0303271 A1 | 11/2012 | Chowdhary et al. | |
| 2012/0316774 A1 | 12/2012 | Yariv et al. | |
| 2012/0330544 A1 | 12/2012 | Joong et al. | |
| 2013/0006517 A1 | 1/2013 | Ofek et al. | |
| 2014/0172291 A1 | 6/2014 | Lookingbill et al. | |

OTHER PUBLICATIONS

"Global Positioning System" Wikipedia, Last Modified on Mar. 28, 2011, 17 Pages, [online] [retrieved on Mar. 31, 2011] retrieved from the internet <URL:http://en.wikipedia.org/wiki/Global.sub.--Positioning.sub.--Syste-m>.

Lester, J., et al., "MobileSense—Sensing Modes of Transportation in Studies of the Built Environment," International Workshop on Urban, Community and Social Applications of Networked Sensing Systems, Nov. 4, 2008, pp. 46-50.

Schussler, N., et al., "Identifying trips and activities and their characteristics from GPS raw data without further information" 8.sup.th International Conference on Survey Methods in Transport, Annecy, May 2008, pp. 1-28.

Stopher, P., et al., "Deducing mode and purpose from GPS data" Institute of Transport and Logistics Studies, Apr. 2008, pp. 1-13.

Upadhyay, et al., "Optimal parameter values for mode detection in GPS post-processing: An experiment" Working Paper, 507, IVT, ETH Zurich, Zurich, Jul. 2008, 23 Pages.

Welbourne, E., et al., "Mobile Context Inference Using Low-Cost Sensors," T. Strang and C. Linnhoff-Popien: LoCA 2005, LNCS 3479, pp. 254-263.

PCT International Search Report and Written Opinion, PCT/US2012/030978, Oct. 28, 2012, 8 Pages.

\* cited by examiner

COLOR WHEEL

VISUALIZATION OF TRAFFIC PATTERNS USING GPS DATA

CROSS-REFERENCE TO RELATED APPLICATIONS

This application is a continuation of application Ser. No. 14/189,933, filed Feb. 25, 2014, which is a continuation of application Ser. No. 12/898,618, filed Oct. 5, 2010, both of which are incorporated by reference herein.

BACKGROUND

1. Field of Art

The present invention relates to generating maps that display traffic information gathered from global positioning system (GPS) devices.

2. Description of Related Art

Generally, GPS devices communicate with satellites to determine the precise location of the device. GPS devices are commonly used in navigation and route guidance systems. In part due to the popularity of such navigation and route guidance systems, GPS technology has been included in a variety of consumer products ranging from vehicles to mobile devices.

SUMMARY

Data received from a plurality of GPS devices are collected and displayed on a map using representations that visually indicate the location, direction of travel, and speed of travel of the GPS devices. The GPS devices can be GPS equipped mobile phones or GPS receivers. The GPS device collects and sends GPS data, which includes data about the location, the direction of travel, and/or the speed of travel.

A color can be assigned to the representation to signify an attribute of the travel of the GPS device, such as the direction of travel, the speed of travel, or other physical quantity, of the GPS device. The representation is associated with a road segment for display on a map.

In certain implementations, the display of a plurality of representations on a road can be used to determine usage information about the road, such as whether the road is a one-way, the average speed of vehicles on the road, the presence of turn restrictions at an intersection, and the location of stop signs. These determinations can be made algorithmically by aggregating the data for one or more road segments, or ad hoc by a human observer based on judgment. The display of GPS data can also be used to generate a map of preferred navigation routes.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Embodiments of the present invention provide systems, methods, and computer-readable storage media for representing and displaying on a map the speed and direction of travel of GPS devices. A GPS device can gather data about the location, direction of travel, and speed of travel of the GPS device. The GPS data can be displayed as a representation on roads in a map. The term "road," as used herein, entails any path, road, street, highway, or unpaved road on which vehicles or individuals can travel. A "map," as used herein, refers to any physical or digital representation of a region of the earth, including a representation of the roads and surfaces of the earth.

System Architecture

Figure 1:
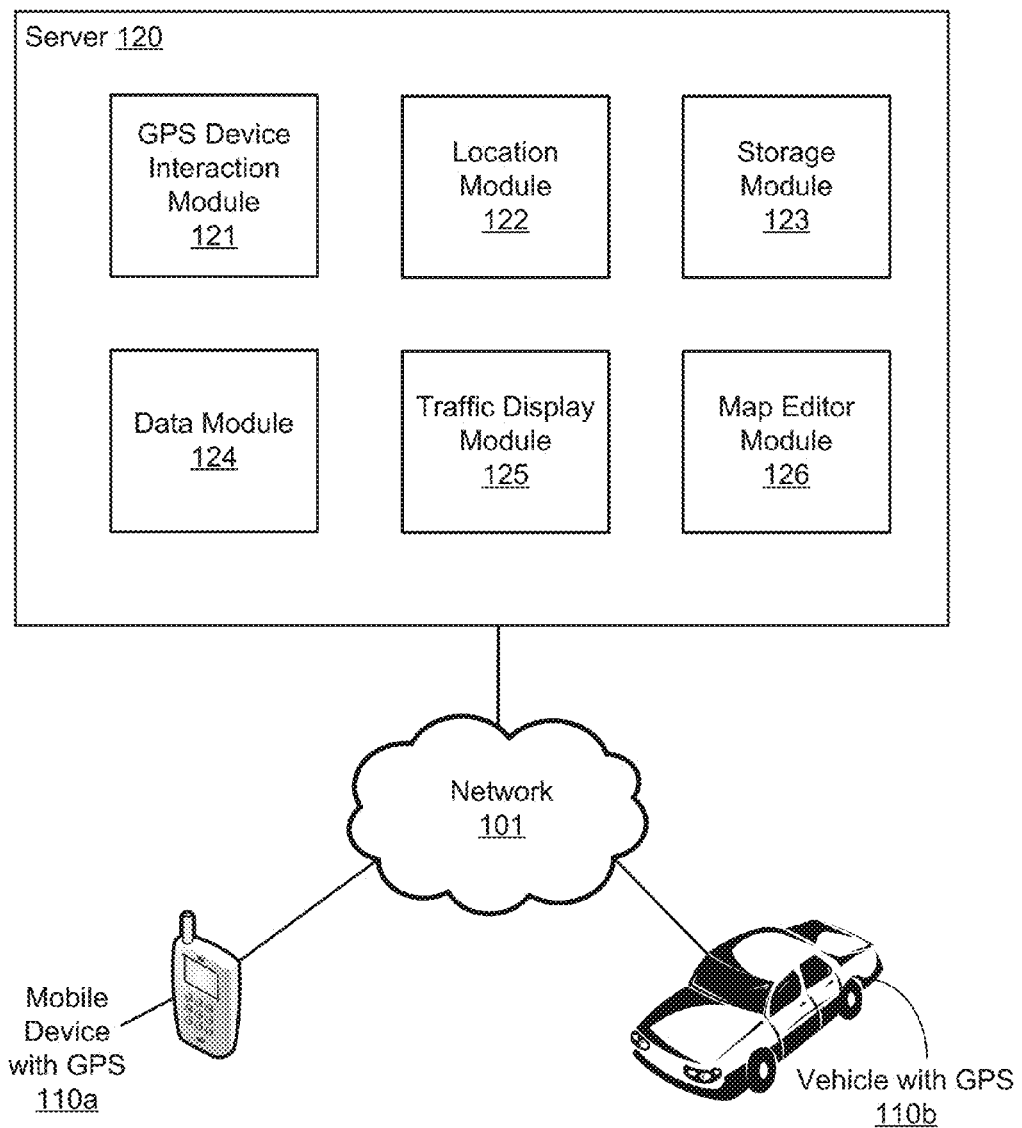
FIG. 1 is a high-level block diagram of the computing environment in accordance with an embodiment of the invention.

FIG. 1 is a high level block diagram of a system environment 100 configured according to one embodiment. The system environment 100 includes a network 101, at least one GPS device 110 and a server 120.

The network 101 represents the communication pathways between the server 120 and the GPS devices 110. In one embodiment, the network 101 is the Internet and uses standard communications technologies and/or protocols. The network 101 can also utilize dedicated, custom, or private communications links that are not necessarily part of the Internet.

The system environment 100 also includes at least one GPS device 110, such as a mobile device with GPS 110a or a vehicle with a GPS receiver 110b. The mobile device with GPS 110a can be any mobile device equipped with GPS, such as a smart phone or personal digital assistant (PDA), or a dedicated GPS receiver/transmitter. FIG. 1 illustrates two GPS devices 110 for clarity; in practice, there will be hundreds and likely thousands of GPS devices 110 from which GPS data is received in accordance with the present invention. The vehicle with GPS 110b can be any vehicle equipped with a GPS receiver (either OEM or after-market), such as a car, truck, motorcycle, or fleet vehicle. The GPS data that is received from a GPS device 110 is referred to herein as a sample of data (or "GPS sample"). The GPS sample includes data about the location, the direction of travel, and/or the speed of travel of the GPS device 110. In some embodiments, the GPS sample may include the location and the direction of travel of the GPS device 110 or just the location of the GPS device. The GPS sample from the GPS device 110 is communicated to the server 120 via the network 101.

The GPS devices 110 include a GPS receiver chipset. The GPS receiver chipset receives several sources of differential signals, such as a wide-area augmentation system (WAAS), subscription L-Band signals, or a combination of signal options. The GPS device is composed of an antenna that is tuned to the frequencies transmitted by satellites, receiver-processors, and a highly stable clock. The GPS device may include a display for providing location and speed information to the user.

The server 120 includes a GPS device interaction module 121, a location module 122, a storage module 123, a data module 124, a traffic display module 125, and a map editor module 126.

The GPS device interaction module 121 communicates with a plurality of GPS devices 110 and receives samples of GPS data from the GPS devices 110, and is one means for performing this function. The GPS device interaction module 121 can be configured to receive samples of data from various types of GPS devices 110. The GPS device interaction module 121 sends data about the location of the GPS device 110 received from the respective GPS devices 110 to the location module 122.

The location module 122 receives the data about the location of the GPS devices 110 from the GPS device interaction module 121 and determines the location based on map information (the map information can be stored locally to the GPS device, or accessed remotely from a server), and is one means for performing this function. The location module 122 can integrate map data to place a GPS sample at the proper position on a map within the context of the map data.

The storage module 123 stores the samples of data from a plurality of GPS devices 110 in a database, and is one means for performing this function. Subsequently, the samples of data can be retrieved for further processing.

The data module 124 retrieves samples of data from the database and generates a representation for each GPS sample, and is one means for performing this function. The representation can be a digital or visual image, graphic, icon, or the like. In one embodiment, the representation is an arrow. The data module 124 assigns a color attribute for the representation based an attribute of the sample data, such as the direction of travel or velocity as indicated by the GPS sample. The data module 124 associates the representation with a road segment on a map based on the location indicated by the GPS sample. The process is described in detail with reference to FIG. 3.

The traffic display module 125 formats the display of the representations for display on a display device of the server 120, and is one means for performing this function. In other embodiments, the traffic display module 125 transmits the display of the representations for display on a display device remote from the server 120.

The map editor module 126 edits information about the roads on the map in response to information received from a user of the map, and is one means for performing this function. In practice, the map editor module 126 is used during the construction of digital maps by a map developer, (as contrasted to an end user who simply receives and views a map that has been previously constructed, as for example when viewing navigation directions on a map). The user of the map views the display of a plurality of representations on a road segment on the map and sends information about the road segment to the map editor module 126. The user then controls the map editor module 126 to flag, edit, label, or alter any information or feature about the roads on a map, including the speed limit of the road and the permitted direction(s) of travel on the road. The updated road information is later used in various ways, such as the generation of a map for display on an end user device (e.g., a map equipped mobile phone or a GPS receiver), and the generation of navigation directions.

Figure 2:
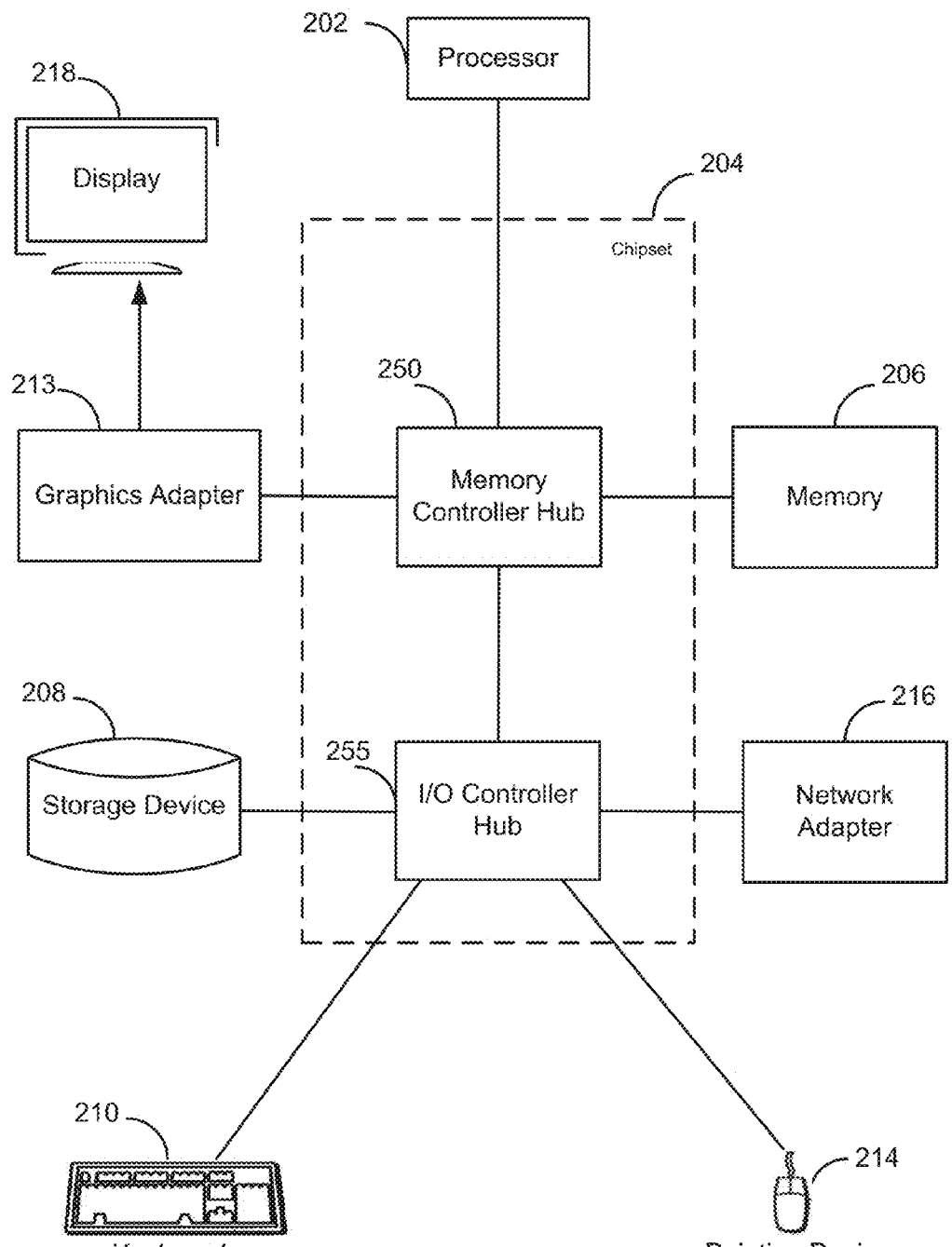
FIG. 2 is a high-level block diagram illustrating an example of a computer for use as a server, in accordance with an embodiment of the invention.

FIG. 2 is a high-level block diagram illustrating an example of a computer 200 for use as a server 120, in accordance with an embodiment of the invention. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. Mechanisms used to convey user input can include, but are not limited to, touchscreen interfaces, touchpads, directional pointing devices, voice controlled interfaces, hardware keyboard shortcuts, directional hardware keys and hardware elements such as wheels and rolling balls. The graphics adapter 213 displays images and other information on the display device 218. In some embodiments, the display device 218 includes a touch screen capability for receiving user input and selections. The network adapter 216 couples the computer system 200 to the communications network 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a server 120 may comprise multiple interconnected individual servers working together to provide the functionality described herein.

Method of Traffic Visualization

Figure 3:
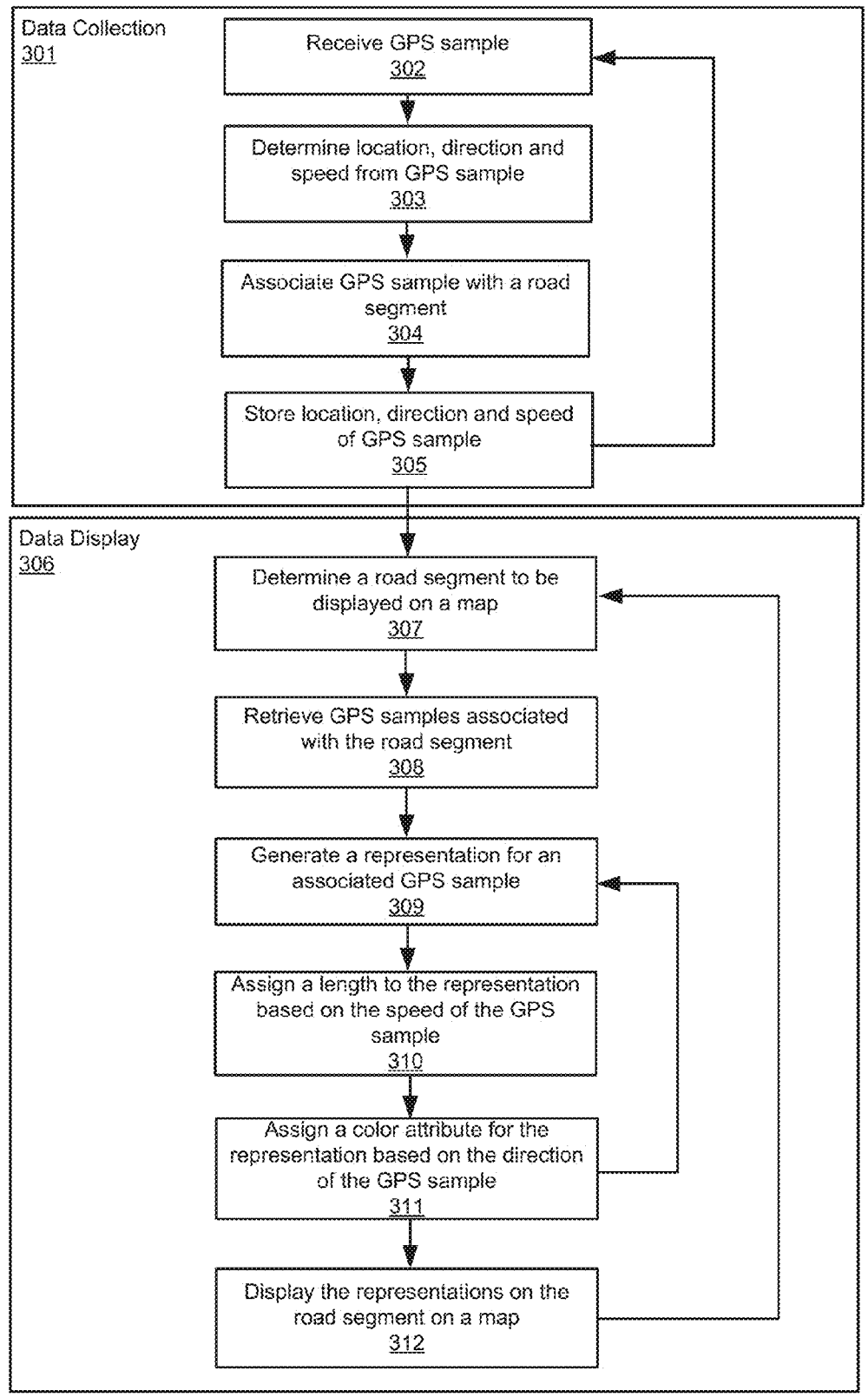
FIG. 3 is a flow diagram illustrating the steps of a method of traffic visualization, in accordance with an embodiment of the invention.

FIG. 3 shows a flow diagram of a method of traffic visualization using GPS data collected from GPS devices 110, which includes a data collection stage 301 and data display stage 306, according to one embodiment of the invention. The method illustrated in FIG. 3 is carried about by the server 120.

The method of the data collection stage 301 includes receiving 302 GPS data from a GPS device 110. In one embodiment, the GPS sample includes the location, direction of travel, and speed of travel of the GPS device 110. In other embodiments, the GPS sample includes the location and direction of the GPS device if that data is provided by the GPS device 110. The GPS sample can include identifying information about the GPS device 110. The GPS device interaction module 121 can remove the identifying information upon receipt of the GPS sample from the GPS device 110. In one embodiment, a GPS sample received from a GPS device includes additional data from which the type of GPS device and/or the mode of transportation used in connection with the GPS device can be inferred. For example, an individual carrying a mobile device while traveling in a car can be distinguished from a GPS sample received from an individual carrying a mobile device while walking based upon whether the device is plugged into a power source, or the average speed of the GPS device.

In some embodiments, the GPS sample is received according a specific upload pattern. The GPS device interaction module 121 can receive the GPS sample at regular intervals. For instance, the GPS sample from a vehicle can be received at every 100 meters traveled by the vehicle, or periodically, e.g., once per minute. In other embodiments, the GPS sample is collected in short intervals or bursts, such that there is a dense sampling of GPS data in a short time period. In some embodiments, the GPS device interaction module 121 receives the GPS sample from a vehicle in an upload pattern that is different from the upload pattern of a mobile device. For instance, a GPS sample from a vehicle may be received at regular intervals followed by short bursts, whereas samples of data from mobile devices may be received only at regular intervals.

In step 303, in one embodiment, the location, direction of travel, and speed of travel is determined from the GPS sample. In some embodiments, the location data includes the latitude and longitude of the GPS device 110. For instance, the location data for a vehicle may include a latitude of 41.8967° N and a longitude of −87.6241° W. The latitude and longitude data can be received in the form of coordinates such as 41° 53' 48" N and 87° 37' 27" W. Based on the latitude and longitude, the location module 122 can use map data to determine the location of the GPS device 110 on a map.

The GPS sample includes the direction of travel of the GPS device 110, and the direction may be relative to points on a fixed compass, such as cardinal points (north, south, east and west) or intermediate directions (northeast, southeast, southwest, northwest) or headings. Alternatively, the direction data may include information about the degrees of rotation relative to a 360 degree compass. For instance, a vehicle facing directly east can correspond to a direction of 90 degrees.

In some embodiments, the GPS device interaction module 121 can determine the speed from the location of the GPS device 110 at two points in time ($t_0$ and $t_1$). In one embodiment, the GPS interaction device module 121 can calculate the speed of the vehicle using the following calculation: s=d/t, where s is speed, d is the total distance travelled, and t is the difference of $t_1 − t_0$.

In step 304, the GPS sample is associated with a road segment on a map. The association step serves to establish which GPS samples are associated with which road segments. A road segment can be a portion of a road between two adjacent intersections. Alternatively or additionally, a road segment can be defined by a specific length (e.g., a road segment is 100 meters long). In other embodiments, the association of a GPS sample to a road segment can be performed in conjunction with storing 305 the GPS sample in the database.

In some embodiments, the association of the sample to a road segment is based upon the calculation of a log probability for the GPS sample based on a Gaussian assumption for distance and direction. The probability of the association of a GPS sample to a road segment is calculated by the computation:

$$\log P(d/d_{error}) + \log P(\theta/\theta_{error}) \quad \text{(Eq. 1)}$$

where P is the probability distribution of samples at a given distance, $d_{error}$ and $\theta_{error}$ are constants, d is the distance of the sample in reference to the center line of the road (reference axis), and $\theta$ is the angle of the sample's direction in reference to the center line of the road (reference axis). P can be a Gaussian probability distribution, but any representative of the distribution of errors may be used.

The best fit association score for a given sample is determined by finding the minimum value for Eq. 1 for all roads that are situated nearby the GPS sample. If no roads are situated nearby the GPS sample, no calculation for association is required. A GPS sample is considered to be "nearby" a road segment if it is within a certain threshold distance (for example, within 20 meters).

In order to associate a GPS sample to a road segment, the best fit score (corresponding to an association with one road segment, i.e. "best segment") is compared to the second best fit score (corresponding to an association with another road segment, i.e. "second best segment"). If the difference between the best fit score and second best fit score meets or exceeds a threshold, the GPS sample is associated with the road segment with the best fit score. If not, the sample is discarded.

The required threshold difference between the scores for the best fit and second best fit is determined by the system designer. A difference of n in the log probability scores corresponds to the association to the best segment being n times more probable than the association to the second best segment. For example, if the log basis is 2 and the threshold difference is set to 1, this means that the GPS sample is twice as likely to be associated with the best segment than with the second best segment. If the threshold difference is set to 3, then the GPS sample is 8 times more probable to be associated with the best segment than with the second best segment. The threshold can be set empirically depending on the degree of accuracy of association desired and to the extent of how many GPS samples are gathered (more GPS samples means a higher threshold can be set to increase the accuracy of association).

Some samples of data result in high quality matches. A high quality match occurs when a sample of GPS data has a high probability of association with a particular road segment. On the other hand, certain GPS devices 110, such as mobile phones, send low quality GPS data and generally result in low quality matches with road segments. In some embodiments, each GPS sample is associated with a road segment based on a best fit score, regardless of the quality of the GPS sample, and none of the samples are discarded.

In step 305, the location, direction of travel and speed of travel are stored as a GPS sample. For example, the storage module 123 can perform the step of storing 305 a GPS sample in a database. Samples of data can be stored for an indefinite period of time to be displayed on a map at a later time.

The operations of data collection 301 are repeated with respect to a large number of GPS devices 110 over an extended period of time, such as an hour, a day, a week, etc. depending on the particular application for which the collected information is to be used. For example, a system administrator can configure the server 120 to collect several hundred or thousands of GPS samples from numerous devices 110 passing through a given street intersection over a one week period in order to determine traffic patterns for the intersection. In addition, the individual steps during the data collection stage 301 can be performed asynchronously from (and in parallel with) each other and when collecting large numbers of GPS samples. Thus, for example, a large number of samples can be first collected and stored, and then subsequently processed to determine location, direction, and speed and associated with a road segment. Similarly, multiple threads can be operating concurrently to collect, analyze, associate and store the samples.

FIG. 3 also illustrates the steps of the data display stage 306, in which data derived from the GPS sample is displayed on a map for one or more road segments. The operations of data display stage 306 are asynchronous from the operations of data collection 301; thus, a large number of GPS samples can be collected 301, and then subsequently displayed 306 as needed; in addition, both stages 301, 306 can be operating concurrently. The data display steps 307-312 can be performed for each road segment to be displayed on a map.

In step 307, a road segment to be displayed on a map is determined. The stored GPS samples that are associated with the selected road segment are retrieved 308 from the data store.

In step 309, a representation is generated to represent each of the GPS samples associated with the road segment. A representation can be generated 309 for each of the GPS samples associated with the road segment or for only selected GPS samples which are high quality matches for the road segment. The representation can be generated 309 by the data module 124 of the server 120. In some embodiments, the representation is an arrow. Alternatively, various other shapes, forms or images may be used as a display representation.

In some embodiments, the representation is assigned 310 a length to represent the speed of the GPS sample. The length of the arrow is proportional to the speed indicated by the GPS sample. The proportionality can be continuous or quantized. For instance, in a quantized relationship, a long, fixed length arrow can represent a fast speed, and a short fixed length arrow can represent a slow speed, where there is a threshold differentiating between fast and slow speeds (e.g., 50 mph). Similarly, multiple speed ranges can used (e.g., 0-10 mph, 11-20 mph, 21-30 mph, etc.) such that each range is associated with a fixed length arrow, and where the length is increased with the respective speed ranges. In a continuous proportionality, the length of the arrow in pixels is a linear function of the speed, e.g., 2 pixels in length per 1 mph. Thus, various lengths of the arrow can correspond to faster or slower speeds of the GPS device. The overall size of the arrow is adjusted to fit proportionally with the dimensions of the road segment on as displayed on a map, given the level of resolution (zoom) at which the map is to be displayed. Other variations in length or size of the representation can be used to represent the speed from a GPS device 110.

Figure 4:
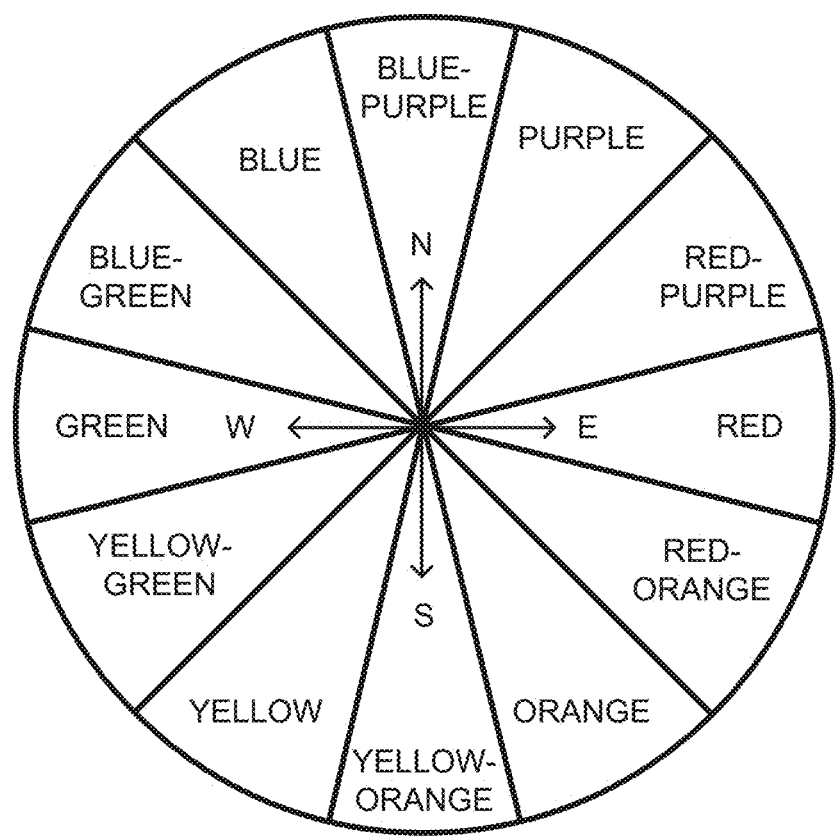
FIG. 4 is a diagram of a color wheel, in accordance with an embodiment of the invention.
Figure 4:
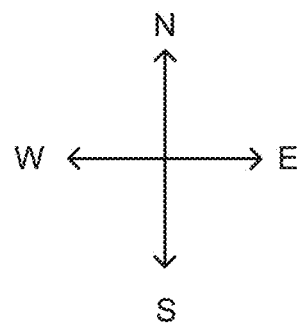

The graphical attributes of the representation, such as size, shape, color, and pattern, are used to convey selected physical quantities (or derivatives thereof) of the GPS samples. In step 311, a color attribute is assigned to the representation to represent the direction of travel indicated by the GPS sample. In one embodiment, a color wheel is used to represent the direction of travel of the GPS device 110. FIG. 4 shows a color wheel, according to one embodiment of the invention. The color wheel can be aligned with a compass, such that a specific color is associated with a specific direction or range of directions on the compass. The color wheel can include primary colors, such as red, yellow and blue. In other embodiments, the color wheel can also include secondary colors (orange, green, and purple) and/or tertiary colors (red-orange, yellow-orange, yellow-green, blue-green, blue-purple, and red-purple). In some embodiments, the color wheel may include additional or fewer colors, and is not limited to a certain number of colors or a specific spectrum of colors.

In FIG. 4, the direction corresponding with east on a compass is associated with the color red, and the direction of west is associated with the color green, according to one embodiment. A range of directions can also be associated with a particular shade of color. In FIG. 4, the color blue-purple is associated with the direction north (which can be set at 0°). In this example, a range of directions that are within approximately 15° east or west from north are also associated with the color blue-purple.

Various graphical attributes, other than color, can be used to represent the direction of travel indicated by the GPS sample, according to embodiments of the present invention. For instance, other shapes, shadings, patterns, or markings on the arrow can be used to represent direction. Similarly, other graphical attributes can be used to present the speed of travel, including color, shape, pattern, or the like.

Steps 309-311 can generally be performed together for a large collection of GPS samples, such as hundreds or thousands, depending on the particular application, as mentioned above. In one embodiment, steps 309-311 are performed for each GPS sample to be displayed on the road segment on the map. These steps may be repeated consequentially or asynchronously for one sample at a time or may be performed in aggregate for multiple GPS samples at once. Similarly, multiple threads can be operating concurrently to perform the data display stage 306.

After these steps are performed for a collection of samples, then in step 312, the representations are displayed on the associated road segments on the map, for example, by the traffic display module 125 on the server 120. In other embodiments, the representation is formatted by the traffic display module 125 for display at a remote display device.

Figure 5:
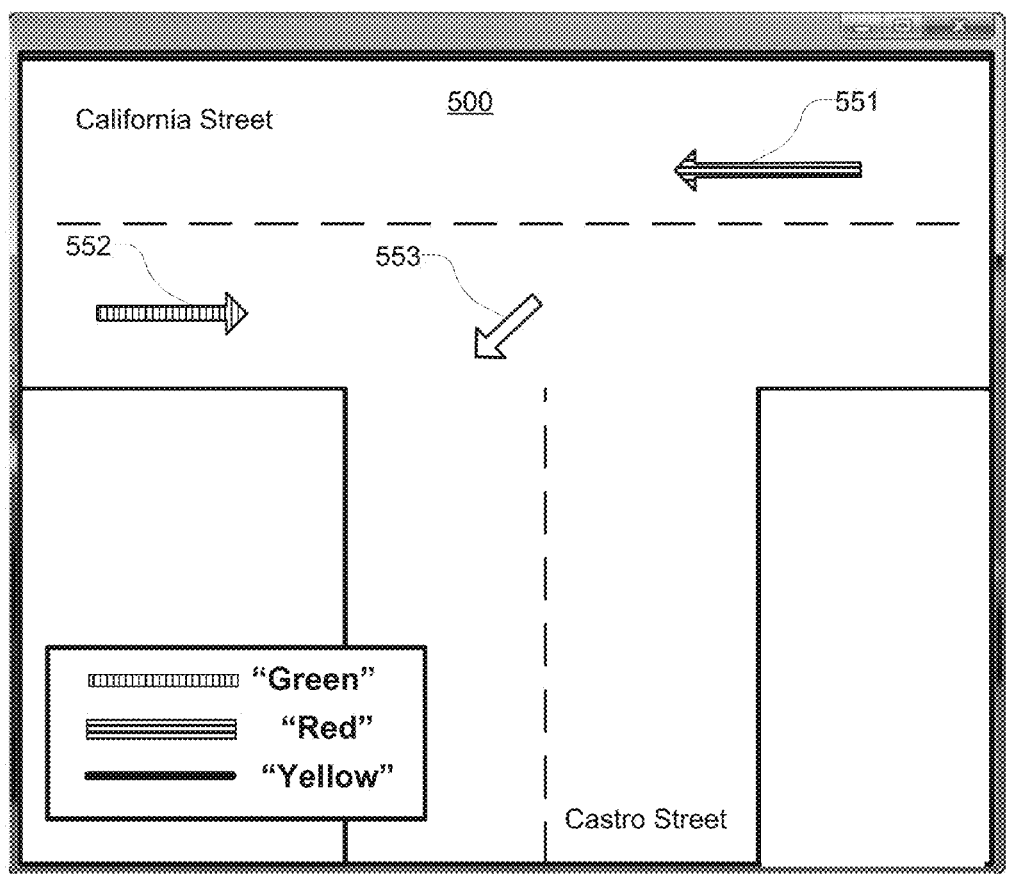
FIG. 5 is a diagram of a map displaying representations of samples of GPS data, according to an embodiment of the invention.

FIG. 5 is a very simplified diagram of a digital map 500 with representations in the form of arrows 551, 552, 553, to illustrate the basic representations used in accordance with an embodiment of the invention. FIG. 5 shows a map displaying arrows of various lengths at the intersection of California Street and Castro Street. Here, colors are shown as fill patterns (equivalently, textures) according to the key. One arrow 551 represents a GPS sample received from a vehicle that traveled directly west on California Street, according to the compass shown in FIG. 5. Based on the color wheel in FIG. 4, this arrow would be colored green. Another arrow 552 on the map is used to represent that a vehicle that was traveling directly east on California Street; it would be colored red. The remaining arrow 553 represents a vehicle traveling in a southwest direction from California Street onto Castro Street. This arrow would be colored yellow, representing a range of directions of 195°-225° on a compass.

The length of the arrow can be proportional to the speed of the vehicle. For example, the arrow 553 is shorter in length than the other arrows 551, 552 on the map, and represents a vehicle moving at a slow speed, whereas the longer arrows 551, 552 represent faster moving vehicles.

Applications of Traffic Visualization

In various embodiments, the methods described above can be applied to gather and deduce information about roads and to label or edit maps based on the information. Examples of applications of the disclosed techniques of traffic visualization are provided below.

Direction of Travel on Roads

The presence and detection of one-way roads is an example application of the disclosed techniques of traffic visualization. If a road is a two-way road, the aggregation of samples of GPS data will indicate that the vehicles on the road were traveling in two directions. In one example, with a sufficiently large small of data, such as several hundred or more samples, a two-way road would have a display with a plurality of arrows of one color pointing in a certain direction and a plurality of arrows of a different color pointing in the opposite direction. For example, if the two-way road travels east and west, a plurality of arrows would be red and a plurality of arrows would be green, based on the color wheel in FIG. 4.

Figure 6:
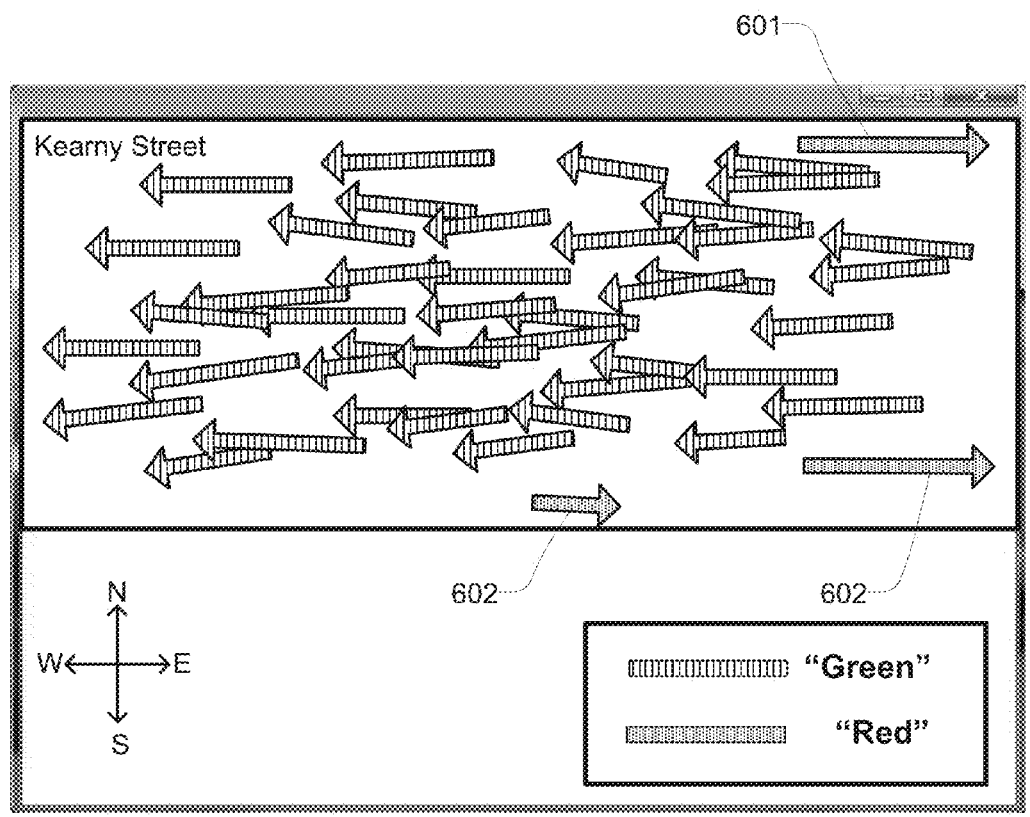
FIG. 6 is a diagram of a map displaying representations of samples of GPS data from a one-way street, according to an embodiment of the invention.

If a road is a one-way road, a majority of the arrows will be of the same color and pointing in the same direction on the map. FIG. 6 shows an example of a map displaying a one-way road. A large majority of the "green" arrows 601 on the map are shown heading west. There are three "red" arrows 602 on the heading east. A user of the map could deduce from the display of FIG. 6 that this road segment is very likely to be a one-way road, based on the observation that a majority of the arrows 601 are of the same color (i.e., green) and point in the same direction (i.e., west). Arrows 602 can represent a vehicle moving in reverse in order to park, a pedestrian traveling east on the road, or someone traveling the wrong way on a one-way road. The user of the map can instruct the map editor module 126 to flag or label this road segment as a potential one-way road.

In some embodiments, the map editor module 126 can automatically identify a possible one-way road if a minimum number of the samples of data are high quality matches and/or a minimum percentage of the high quality matches indicate the same direction of travel. High quality matches exist when GPS samples of data have a high probability of association with a particular road segment. For instance, a road can be flagged as a one-way road if there are greater than 30 high quality samples of data, and if greater than a super-majority (e.g. 95%) of the samples of data associated with the road segment is represented as having the same direction of travel. Higher or lower thresholds or percentages may be used in other examples.

In some cases, additional indicators can be used to verify that the road is truly a one-way road. The existence of a one-way road can be verified by additional satellite or digital images from the road showing street signs or the direction of parked cars. If there are sufficient markers that indicate the existence of a one-way road, the user of the map may flag the road segment as a possible one-way road, or instruct the map editor module 126 to label the map as a one-way road.

Speed and Usage of Roads

Determining the average speed of a road is another example application of the techniques of traffic visualization. The speed of the road can be determined by assessing the lengths of the arrows associated with the road segment. For instance, if a given length arrow is used to represent a speed of 60 mph and a majority of the arrows displayed on a road segment have the same length, then the user of the map can very quickly deduce that the road has an average speed of 60 mph. Conversely, if the length of arrows for a given road segment vary significantly (and it's known that there are no traffic lights or other controls on the road segment), this can indicate that the road segment is subject to frequent traffic congestion. Visualization of speed is helpful to determine the appropriate categorization of a road segment as a primary, secondary or other type of road. Visualization of the speed of vehicles can reveal road segments that are used by local drivers as short cuts or preferred routes, which information would not be apparent simply from static information about the road segment, such as its speed limit, type and so forth.

In some embodiments, the data module 124 can automatically calculate the average speed from a plurality of speeds indicated by samples of GPS data. The map editor module 126 can label the map to indicate the average speed of the road segment on the map. In other embodiments, the map editor module 126 receives instructions from a user of the map to indicate the average speed of the road segment on the map.

Determining the amount of road usage is another example application of the techniques of traffic visualization. The amount of road usage can also be determined by the number of representations associated with and displayed on a road segment. For example, a map display of thousands of arrows associated with a particular road segment from data gathered from a fixed, relatively short period of time indicates that the road has heavy traffic during the time period. This can indicate that a road segment—even nominally a small street—is used as well as a popular route or throughway. In some embodiments, the data module 124 can automatically determine the amount of road usage by calculating the number of samples of GPS data associated with a road segment in a given period of time. The map editor module 126 can label the map to indicate the amount of road usage associated with the road segment on the map. In other embodiments, the map editor module 126 receives information from a user of the map that indicates the amount of road usage associated with the road segment.

Turn Restrictions

Figure 7:
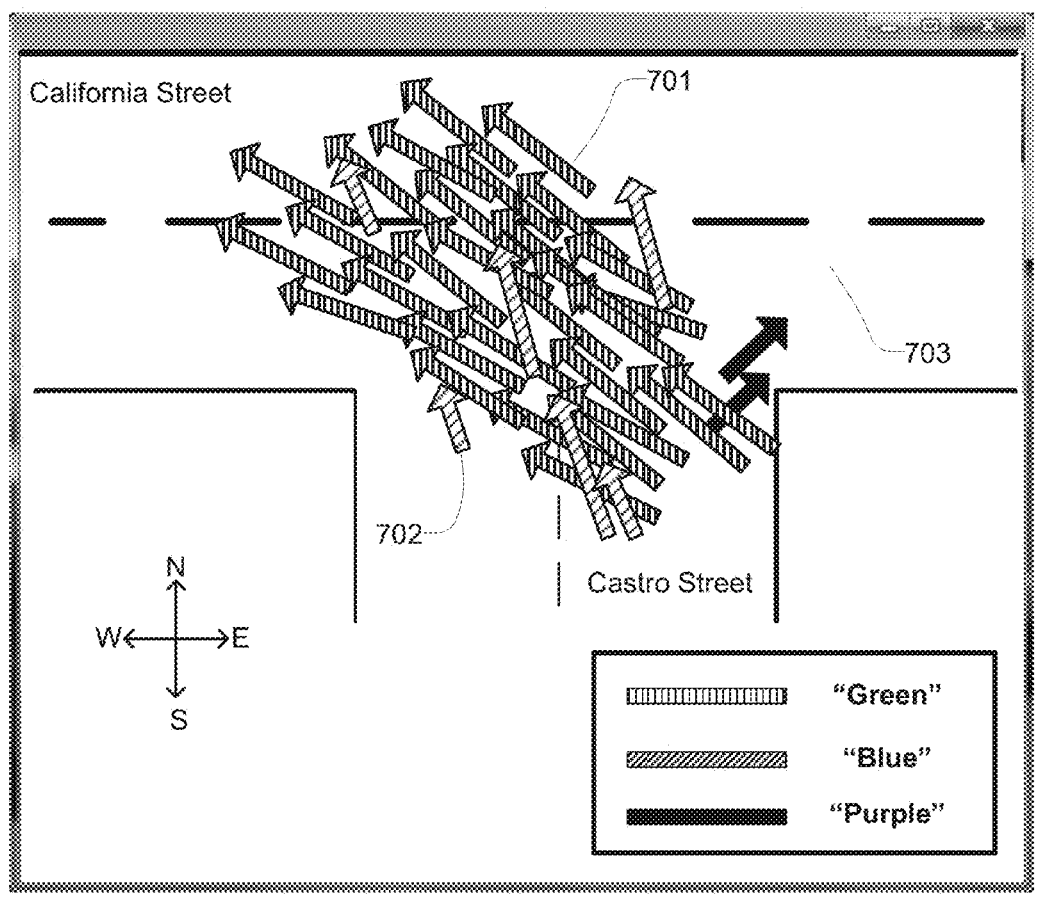
FIG. 7 is a diagram of a map displaying representations of samples of GPS data indicating a no-right turn restriction at an intersection, according to an embodiment of the invention.

The direction of arrows associated with a road segment can also be used to infer turn restrictions on a road. For instance, FIG. 7 shows a large majority of "blue" arrows 701 and "blue-green" arrows 702 pointing in a north-westerly direction (i.e., left) at the intersection of California and Castro Streets. This data could be used to infer that there is a no-right turn restriction at this intersection. A few "purple" arrows 703 may point towards the north-easterly direction, indicating that some vehicles travelled right at the intersection. A certain threshold can be set for automatically flagging a possible turn restriction at an intersection (e.g., 90% of the arrows must point in a certain direction at an intersection to mark a possible turn restriction). This turn restriction can be verified by observation of satellite or street level imagery of the intersection, such as the presence of no-right turn signs or one-way signs. In some embodiments, the map editor module 126 can identify a turn-restriction based on the direction of a plurality of arrows associated with a road segment. In other embodiments, the map editor module 126 receives instructions from a user of the map to indicate the possibility of a turn restriction at the intersection.

Location of Stop Signals

The presence and detection of a stop signals (including stop signs and stop lights) at a particular location is another example application of the techniques of traffic visualization. In some embodiments, the samples of GPS data is collected in short bursts, which can indicate that vehicle has stopped at an intersection. For example, if a certain number (or percentage) of the samples of GPS data indicate that multiple vehicles are stopped at a certain intersection (whose location is known from existing map data), the intersection can be flagged for a possible stop signal. The determination between a stop light and a stop sign can then be made algorithmically based, for example, on the average length of time that high quality samples from GPS devices remain stopped, and the regularity of the stopped period (e.g., samples indicating that the devices travelling remained stopped at a given intersection on average for 60 seconds, followed by 60 seconds in which few devices are stopped).

Figure 8:
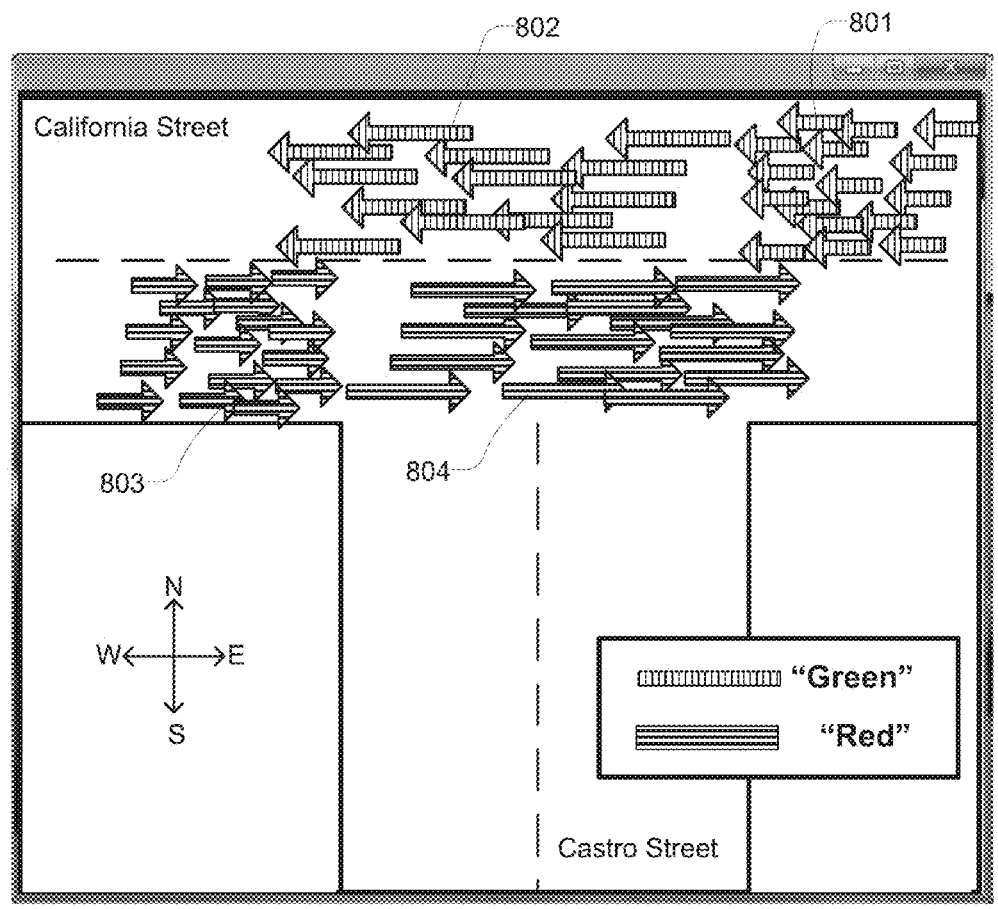
FIG. 8 is a diagram of a map displaying representations of samples of GPS data indicating the presence of stop signs at an intersection, according to an embodiment of the invention.

FIG. 8 shows an example of representations of samples of GPS data from vehicles at the intersection of California and Castro Streets, according to one embodiment of the invention. The majority of "green" arrows 801 situated in the top lane of California Street are short in length at the eastern edge of the intersection of California and Castro Streets, indicating that vehicles are traveling at a slow speed and have come to a stop at the intersection. The "green" arrows 802 are progressively longer in length as the vehicles speed up and travel west across the intersection. Similarly, the "red" arrows 803 are short in length as the vehicles come to a stop at the western edge of the intersection and then are longer in length (arrows 804) as the vehicles travel east across the intersection. These representations can indicate that there are two stop signals for both lanes of California Street, situated at the intersection with Castro Street.

The presence of the stop signal and the determination of its type can be verified by satellite imagery or street level images of the intersection. In some embodiments, the data module 124 can identify the presence of a stop signal based on speeds indicated by samples of GPS data, and the map editor module 126 can flag and/or label the presence of a stop signal on the map. If so configured, the data module 124 can further initially classify the stop signal as either a stop sign or stop light, based on analysis of the periodicity and distribution of high quality samples. The user can then review the flagged stop signal (and initial type classification) using satellite or street level images of the intersection, to confirm its presence (as opposed, for example to the presence of a road hazard), and to determine (or confirm) whether the signal is a stop sign or stop light. In other embodiments, the map editor module 126 receives instructions from a user of the map to indicate the possible presence of a stop signal and its type.

Types of Roads

The display of GPS data associated with a road segment can be used to infer information about the type of road. For instance, a road segment may be designated as a dirt or unpaved road on a map, using map data from existing sources. However, once traffic data is gathered for the road segment and displayed on a map, a user of the map may observe that a large number of arrows are associated with the road segment, possibly indicating that it is actually a paved road with a substantial amount of traffic. In some embodiments, the data module 124 can assess the number of samples of GPS data associated with the road, and where the number of high quality samples exceeds a threshold amount based on known levels of usages associated with paved and unpaved roads, the map editor module 126 can flag the road for further analysis to determine whether the road is in fact a dirt road. The road type can be verified by the user based on a review of satellite or street level imagery of road segment. In other embodiments, the map editor module 126 can receive instructions from a user of the map to label the road segment as a dirt road or paved road.

Generating a Heat Map

The GPS data associated with a road segment can also be used to generate a "heat map." A heat map is useful for assessing which roads are regularly used by motorists and for determining which roads should be recommended for route guidance.

The process of creating a heat map begins with the data collection stage 301 shown in FIG. 3. GPS samples are received 302 from GPS devices 110, and the location, direction and speed of each GPS sample is determined 303. The GPS samples are associated 304 with a road segment, and the location, direction and speed of the GPS samples are stored 305. For each road segment to be displayed on the heat map, the aggregate statistics of the GPS samples are collated and a representation of the road segment is generated, as described below.

In one embodiment, a basic heat map for a road has two attributes: the width of the representation of the road and the color of the representation of the road. The width of the representation of the road represents the relative amount of traffic on the road, irrespective of the physical width of the road. The width of the representation of a given road segment can be calculated with the equation:

$$\text{Width} = k * z * \left(\frac{N}{L}\right)^r$$

where

N is the number of GPS samples;

L is the normalized length of the road segment, and is equal to the calculation of: (length of the road segment/average length of all road segments);

z is the zoom level at which the road segment is to be displayed, and is related to the current zoom level of the map. The width of the road as rendered depends on the current zoom level of the map; and k and r are constants that are defined empirically, such that the resulting calculation of various widths can be distinguished based on different levels of traffic density and such that other road segments or parts of the background map are not obscured by the width of the representation of the road segment.

The color of the representation of the road represents the average speed of vehicles on the road. The average speed of the road can be determined by the following steps:

1) associating a number of samples of data to a road segment, 2) counting the number of high quality samples of data associated with the road segment, and 3) calculating the mean speed of the high quality samples of data.

The color of the representation of the road on the heat map can be determined based on a set of colors that are designated for a certain range of speeds. For instance, Table 1 could be used to designate colors for a representation of the road on a heat map.

TABLE 1

| Color | Speed (mph) |
|---|---|
| Black | No traffic observed |
| Red | 0 to 5 |
| Red-Orange | 6 to 11 |
| Orange | 12 to 18 |
| Yellow-Orange | 19 to 24 |
| Yellow | 25 to 30 |
| Yellow-Green | 31 to 35 |
| Green | 36 to 43 |
| Blue-Green | 44 to 50 |
| Blue | 51 to 55 |
| Blue-Purple | 56 to 61 |
| Purple | 62 to 68 |

Figure 9:
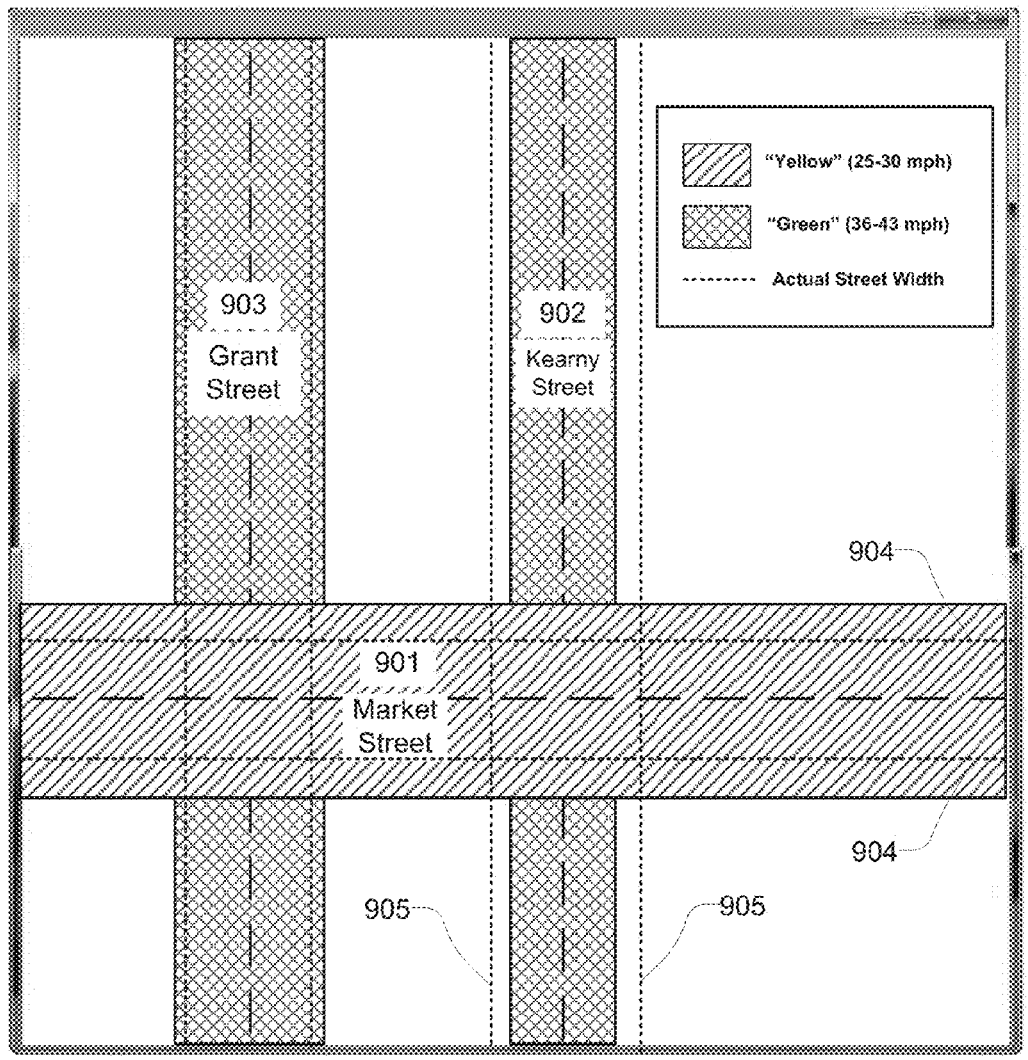
FIG. 9 is a diagram of a heat map displaying various roads, according to an embodiment of the invention.

FIG. 9 shows an example of a heat map, according to one embodiment of the invention. For example, the representation of Market Street 901 may have thousands of associated samples of data. The samples of data may indicate that vehicles travel on the road at an average speed of 30 mph, and thus the representation of Market Street 901 would be yellow, based on Table 1. The average speed of vehicles on Kearny Street 902 and Grant Street 903 may be 40 mph, and the color of the representation would be green to represent that average speed. The representation of Market Street 901 has a larger width on the map to represent heavier traffic compared with other roads 902, 903. In contrast, the representation of Kearny Street 902 has less traffic, and thus is shown narrower to represent the fewer number of vehicles traveling on the road. In addition, represented width of Market Street 901 is wider than its actual width, as show by width lines 904. Similarly, the represented width of Kearny Street 902 is less than its actual width, as shown by width lines 905.

In some embodiments, the data module 124 can determine the number of samples of data associated with a road and the average speed of the road based on the samples. The traffic display module 125 can assign a corresponding color and width for the representation of the road. This method can be repeated for a plurality of roads using the samples of GPS data associated with the road. The resulting heat map would display roads of various colors and widths according to the number of vehicles traveling on the road and the speed of the vehicles.

The heat map can then be used to generate preferred routes for providing directions to users. For instance, if there are more samples of data associated with Grant Street 903 compared to Kearny Street 902, Grant Street 903 would have a larger width on the heat map. This can indicate that motorists prefer to use Grant Street 903 over Kearny Street 902 in reaching a certain destination. A user of the map, in the process of defining navigation route preferences for a routing engine, can designate Grant Street 903 as a preferred road and instruct a route guidance system to select Grant Street 903 as a preferred route to motorists.

Certain road segments may have fewer associated samples of data. This may indicate that motorists rarely use this road and may not be a preferred route. A user of the map may request the map editor module 126 to decrease the priority of these roads on the heat map so that the roads are not recommended as preferred roads for route guidance. In some embodiments, the data module 124 can identify the number of samples of GPS data associated with a road, and the map editor module 126 can flag the road for further analysis to determine whether the road should be used in route guidance.

ADDITIONAL CONSIDERATIONS

The present invention has been described in particular detail with respect to several possible embodiments. Those of skill in the art will appreciate that the invention may be practiced in other embodiments. It is also appreciated that embodiments of the invention may be practiced in other communications network environments that include components to enable the data collection and data display steps, as described above.

The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be persistently stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for visualizing traffic data on a map, comprising:
    receiving a plurality of GPS samples from a plurality of GPS devices, each GPS sample comprising a location, a direction of travel and a speed of travel of a GPS device from which the GPS sample is received;
    associating selected GPS samples with respective road segments on a map based on the location and the direction of travel in each selected GPS sample;

generating, for display on the map, representations based on the GPS samples associated with the respective road segments;

receiving, from a user viewing the display, an indication of a road segment of the map as a preferred route of travel; and assigning the road segment as the preferred route of travel.

2. The computer implemented method of claim 1, wherein a generated representation visually indicates the direction of travel and the speed of travel for the GPS device that provided the GPS sample, the method further comprising assigning a graphical attribute of the representation to a physical attribute based on the GPS sample.

3. The computer-implemented method of claim 2, further comprising assigning a color to the generated representation, wherein the color represents the direction of travel.

4. The computer-implemented method of claim 2, wherein the generated representation is an arrow.

5. The computer-implemented method of claim 1, further comprising:

receiving, from the user, an indication of a turn restriction on the road segment; and assigning the turn restriction to the road segment.

6. The computer-implemented method of claim 1, wherein each generated representation visually indicates the direction of travel and the speed of travel for the GPS device that provided a GPS sample.

7. The computer implemented method of claim 1, wherein associating the GPS sample to the road segment is based upon a log probability of the association of the GPS sample to the road segment.

8. A non-transitory computer-readable storage medium storing executable computer program instructions for visualizing traffic data on a map, the computer program instructions executable to perform steps comprising:

receiving a plurality of GPS samples from a plurality of GPS devices, each GPS sample comprising a location, a direction of travel and a speed of travel of a GPS device from which the GPS sample is received;

associating selected GPS samples with respective road segments on a map based on the location and the direction of travel in each selected GPS sample;

generating, for display on the map, representations based on the GPS samples associated with the respective road segments;

receiving, from a user viewing the display, an indication of a road segment of the map as a preferred route of travel; and assigning the road segment as the preferred route of travel.

9. The computer-readable storage medium of claim 8, wherein a generated representation visually indicates the direction of travel and the speed of travel for the GPS device that provided the GPS sample, the method further comprising assigning a graphical attribute of the representation to a physical attribute based on the GPS sample.

10. The computer-readable storage medium of claim 9, further comprising assigning a color to the generated representation, wherein the color represents the direction of travel.

11. The computer-readable storage medium of claim 9, wherein the generated representation is an arrow.

12. The computer-readable storage medium of claim 8, further comprising:

receiving, from the user, an indication of a turn restriction on the road segment; and assigning the turn restriction to the road segment.

13. The computer-readable storage medium of claim 8, wherein each generated representation visually indicates the direction of travel and the speed of travel for the GPS device that provided a GPS sample.

14. The computer-readable storage medium of claim 8, wherein associating the GPS sample to the road segment is based upon a log probability of the association of the GPS sample to the road segment.

15. A computer system for visualizing traffic data on a map, comprising:

a computer processor for executing computer program instructions; and a non-transitory computer-readable storage medium storing computer program instructions executable to perform steps comprising:

receiving a plurality of GPS samples from a plurality of GPS devices, each GPS sample comprising a location, a direction of travel and a speed of travel of a GPS device from which the GPS sample is received;

associating selected GPS samples with respective road segments on a map based on the location and the direction of travel in each selected GPS sample;

generating, for display on the map, representations based on the GPS samples associated with the respective road segments;

receiving, from a user viewing the display, an indication of a road segment of the map as a preferred route of travel; and assigning the road segment as the preferred route of travel.

16. The computer system of claim 15, wherein a generated representation visually indicates the direction of travel and the speed of travel for the GPS device that provided the GPS sample, the method further comprising assigning a graphical attribute of the representation to a physical attribute based on the GPS sample.

17. The computer system of claim 16, further comprising assigning a color to the generated representation, wherein the color represents the direction of travel.

18. The computer system of claim 16, wherein the generated representation is an arrow.

19. The computer system of claim 15, further comprising:

receiving, from the user, an indication of a turn restriction on the road segment; and assigning the turn restriction to the road segment.

20. The computer system of claim 15, wherein each generated representation visually indicates the direction of travel and the speed of travel for the GPS device that provided a GPS sample.

* * * * *